United States Patent

[11] 3,540,489

[72] Inventor LaVerne C. Hanson
P.O. Box 161, Duluth, Minnesota 55801
[22] Filed June 24, 1968
[45] Patented Nov. 17, 1970

[54] HOSES
8 Claims, 2 Drawing Figs.
[52] U.S. Cl. ........................................................ 138/121
[51] Int. Cl. ....................................................... F16l 11/08
[50] Field of Search ............................................ 138/121, 122, 173

[56] References Cited
UNITED STATES PATENTS
| 2,490,513 | 12/1949 | Dreyer | 138/121 |
| 3,050,087 | 8/1962 | Caplan | 138/121 |

Primary Examiner—Henry S. Jaudon
Attorney—Stryker and Jacobson

ABSTRACT: A universal radiator hose sectionally separable and radially expandable to fit various diameter hose connections.

Patented Nov. 17, 1970

3,540,489

INVENTOR
LaVerne C. Hanson
BY Stryker and Jacobson
ATTORNEYS

HOSES

BACKGROUND OF THE INVENTION

1. Field of the Invention

This invention relates generally to deformable hoses, and more specifically, to a variable diameter radiator hose.

2. Description of the Prior Art

Prior art automobile radiator hoses have been manufactured in various diameters and lengths to accommodate the many different types of automobiles. Because of the difference in types of automobiles and the lack of industry acceptance of standard size hose connections, radiator hoses of different lengths and diameters are required. Consequently, to provide fast replacement service for a customer, whose radiator hose has broken, a retail outlet must have on hand a large selection of hoses to accommodate the many different automobiles. Having a large inventory of radiator hoses on hand is costly, takes up space in the retail store, and it requires the retailer to keep an inventory of all the radiator hoses so he knows which one to order replacements for when the inventory becomes low. Thus, only larger retailers contain a complete stock of radiator hoses and the smaller retail outlets, such as service stations, have on hand only the most often used radiator hoses. Consequently, someone having an automobile that is not one of the major models may not be quickly able to obtain the proper size radiator hose for his automobile.

Generally, a radiator hose breaks when the automobile is in operation and the operator is away from his residence. In this kind of emergency the operator must quickly have a replacement radiator hose for his automobile if he is to continue driving. If he doesn't have a replacement radiator hose the loss of coolant would allow the engine to overheat thus ruining the engine.

Prior art radiator hoses ordinarily consist of tubing having straight end portions and a spirally corrugated intermediate length with a continuous spiral wire core embedded in the intermediate corrugated length. The spiral wire core gives the radiator hose rigidity in a radial direction and does not allow the hose to collapse if it is bent or if an external object pushes against it. The straight tubing at the ends of the tubing prevents fluid from leaking between the outside of the hose connection and the inside ends of the hose. Consequently, the radiator hoses are manufactured in specific length for the particular make of automobile. In addition, the ends of these radiator hoses have been unexpandable so that an assortment of various diameter hoses would have to be kept on hand to accommodate the various radiator connections.

I have invented a standard size radiator hose that is adaptable to different diameter hose connections and can be cut to any desired length. My deformable radiator hose eliminates the deficiencies found in spiral wound radiator hose by having a series of deformable members at spaced intervals along the tubing. These members have a star-shaped appearance and are radially deformable to accommodate various diameter hose connections. Because the deformable members are at spaced intervals and not connected, the hose can be cut at various lengths without fear of producing a leaky hose. In addition, the outside of the tubing is wrapped with a closely woven fine mesh fabric to eliminate susceptibility of the hose to rupture due to minute flaws brought about by the molding process of the hose.

SUMMARY OF THE INVENTION

Briefly, the invention comprises an elongated corrugated tubing made from a deformable material having a plurality of deformable, spaced-apart members attached to the wall of the tubing.

DESCRIPTION OF THE PREFERRED EMBODIMENT

Figure 1:
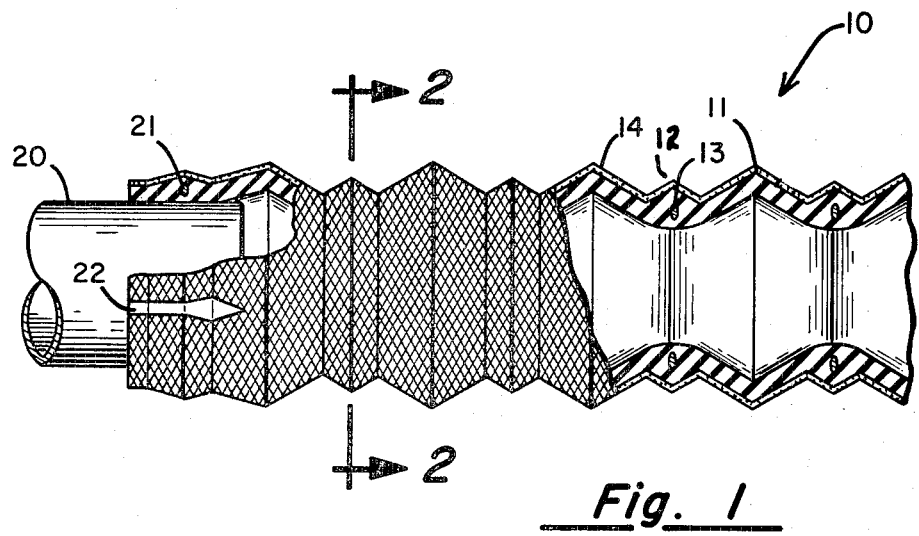
FIG. 1 is a partial cross-sectional view of my tubing shown connected to a hose connection on one end and in vertical section on the opposite end.

Referring to FIG. 1 reference numeral 10 generally denotes a portion of my continuous elongated corrugated tubing or hose. Corrugated tubing 10 has alternately spaced ridges and grooves thereon. Reference numeral 11 denotes a ridge and reference numeral 12 denotes a groove which is reinforced with slightly thicker material than the material along ridge 11. Located within groove 12 is a radially deformable member 13 which is shown partially in section.

Located along the outside of tubing 10 is a fine fabric mesh 14 which prevents rupture of the tubing and holds the tubing in shape. The left end of tubing 10 connects to a hose connector 20 such as found in an automobile radiator. A deformable member 21, which is identical to deformable member 13, is shown in an expanded position around hose connection 20. Deformable member 21 may be made from a resilient material and if so, the radial inward force produced by expanding the deformable member 21, holds the radiator hose in a fluid tight relation around the outside of hose connection 20. In normal use, one places a conventional hose clamp around the radiator hose thus ensuring that the radiator hose will not come off under pressure. However, the preferred embodiment is to have the deformable member made from a nonresilient material. With a nonresilient deformable member an operator can insert an expansion tool into the end of the hose and expand the diameter of the base to fit various size hose connections. Once he removes the expansion tool the hose will remain at the larger diameter and one can easily slip the hose over the hose connection. Then one tightens a hose clamp around the hose and the hose connection which ensures a fluid tight relation between the hose connection and the hose. With expandable tubing of this type, an operator can have on hand one diameter of tubing which can be expanded to accommodate hose connections found in today's automobiles which range from 1⅛ inches to 2 inches in diameter. In order to expand the radiator hose radially with the fabric mesh 14 around the hose, one cuts a number of slits longitudinally along the hose. FIG. 1 shows such a slit 21 that is deformed to the shape shown in FIG. 1 due to the expansion of the tubing.

Figure 2:
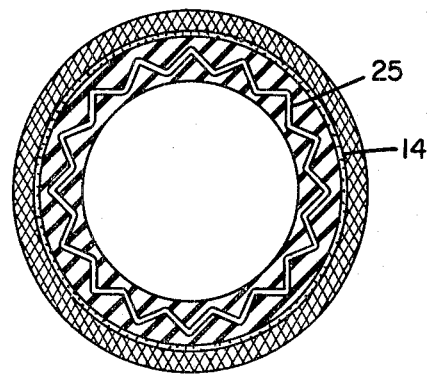
FIG. 2 is a cross-sectional view taken along line 2-2 in FIG. 1.

FIG. 2 shows a cross-sectional view of the deformable member 25 which is identical to previously-mentioned deformable members 13 and 21. Deformable member 25 is a wire ring having a continuous zigzag circumference. While deformable member 25 is shown having a zigzag circumference, other shaped deformable members could also be used, however, the advantage of the particular shape shown in FIG. 2 is that it provides rigidity for the tubing in a radial direction while allowing radial expansion of the tubing. A designer wanting more or less expandability in his deformable member could alter the number of zigzags in the ring circumference as well as the height of the zigzag portion. It is also contemplated that instead of embedding the deformable members in the tubing wall they could be placed in annular grooves located at spaced intervals along the inside of the tubing.

This tubing can be manufactured and supplied to a retail outlet in coiled lengths. When the retailer desires to have a certain length of tubing to replace a broken radiator hose, he merely cuts off a portion and slits the end of the screen mesh. This allows him to radially expand the hose to fit a wide range of hose connections.

I claim:

1. A universal radiator hose radially expandable and sectionally severable for use with a variety of radiator hose connections comprising:

an elongated corrugated tubing having a central axis, said tubing comprising a deformable material and having a smoothly contoured interior, said material having sufficient thickness for embedding a deformable member therein;

a plurality of deformable members embedded in said tubing, said deformable members located at spaced intervals along the length of said tubing and in a plane perpendicular to said axis of said tube so that said tube can be severed at predetermined lengths; and a supporting layer of material located along the entire length of said tubing to prevent rupture of the tubing from internal pressure.

2. A variable diameter hose as in claim 1 wherein deformable members of predetermined diameter are embedded in the wall of the tubing.

3. The variable diameter hose as in claim 1 wherein said tubing corrugations form ridges and grooves at regularly spaced intervals along the annular surface of the tubing, said ridges and grooves respectively defining small and larger diameter annular openings said members being embedded in said tubing at the location of said smaller diameter openings.

4. The invention as in claim 3 wherein said deformable members are expandable radially outward for increasing the diameter of the tubular opening at their respective locations.

5. The invention of claim 3 wherein said deformable member comprises a ring member having a zigzag circumference.

6. The invention as in claim 4 wherein said deformable members are star-shaped.

7. The invention as in claim 4 wherein the tubing wall is reinforced in those areas where said rings are located.

8. The invention as in claim 4 wherein the tubing wall material is characterized by having some resiliency and said deformable members are characterized by being made from a substantially nonresilient material.